United States Patent [19]
Masuda

[11] Patent Number: 6,144,858
[45] Date of Patent: Nov. 7, 2000

[54] MOBILE COMMUNICATION TERMINAL APPARATUS WITH RECEPTION LEVEL MEASUREMENT CONTROL

[75] Inventor: Hiroyoshi Masuda, Tokyo, Japan

[73] Assignee: Mitsubishi Denki Kabushiki Kaisha, Tokyo, Japan

[21] Appl. No.: 09/477,417

[22] Filed: Jan. 4, 2000

[30] Foreign Application Priority Data

Sep. 13, 1999 [JP] Japan ............................ PCT/JP99/4959

[51] Int. Cl.⁷ ................................ H04B 7/26; H04Q 7/36
[52] U.S. Cl. ........................ 455/456; 455/67.1; 455/421; 455/550; 342/450; 342/458; 342/463
[58] Field of Search ..................................... 455/550, 456, 455/38.3, 13.4, 515, 67.1, 575, 522, 421; 342/450, 463, 458

[56] References Cited

U.S. PATENT DOCUMENTS

| | | | |
|---|---|---|---|
| 5,629,710 | 5/1997 | Sawada | 342/450 |
| 5,918,176 | 5/1996 | Arrington, Jr. et al. | 455/456 |
| 5,943,610 | 4/1997 | Endo | 455/456 |
| 5,970,413 | 4/1997 | Gilhousen | 455/550 |
| 5,970,414 | 5/1997 | Bi et al. | 455/456 |
| 6,009,091 | 3/1998 | Stewart et al. | 455/456 |

FOREIGN PATENT DOCUMENTS

| | | |
|---|---|---|
| 6013959 | 1/1994 | Japan . |
| 6351058 | 12/1994 | Japan . |
| 7303275 | 11/1995 | Japan . |
| 8107585 | 4/1996 | Japan . |
| 8195711 | 7/1996 | Japan . |
| 9247735 | 9/1997 | Japan . |
| 9261710 | 10/1997 | Japan . |

*Primary Examiner*—Lee Nguyen
*Assistant Examiner*—Simon Nguyen
*Attorney, Agent, or Firm*—Rothwell, Figg, Ernst & Manbeck

[57] ABSTRACT

Power wastefully consumed in a prior art mobile station in a reception level measurement process and burst transmission is reduced by the invention, by determining the current location of a mobile station by measuring a reception level with respect to an accommodating cell, and suspending a reception level measurement with respect to adjacent cells and burst transmission of a result of measurement when the mobile station is near the center of the accommodating cell.

6 Claims, 9 Drawing Sheets

MOBILE COMMUNICATION TERMINAL APPARATUS WITH RECEPTION LEVEL MEASUREMENT CONTROL

BACKGROUND OF THE INVENTION

1. Field of the Invention

The present invention generally relates to mobile communication apparatus and, more particularly, to a mobile communication apparatus for use in a cellular mobile radio communication system, capable of determining a current location of the mobile apparatus in an accommodating cell by measuring a reception level of a broadcast channel transmitted from a base station and controlling a reception level measurement process in accordance with the current location.

2. Description of the Related Art

Figure 8:
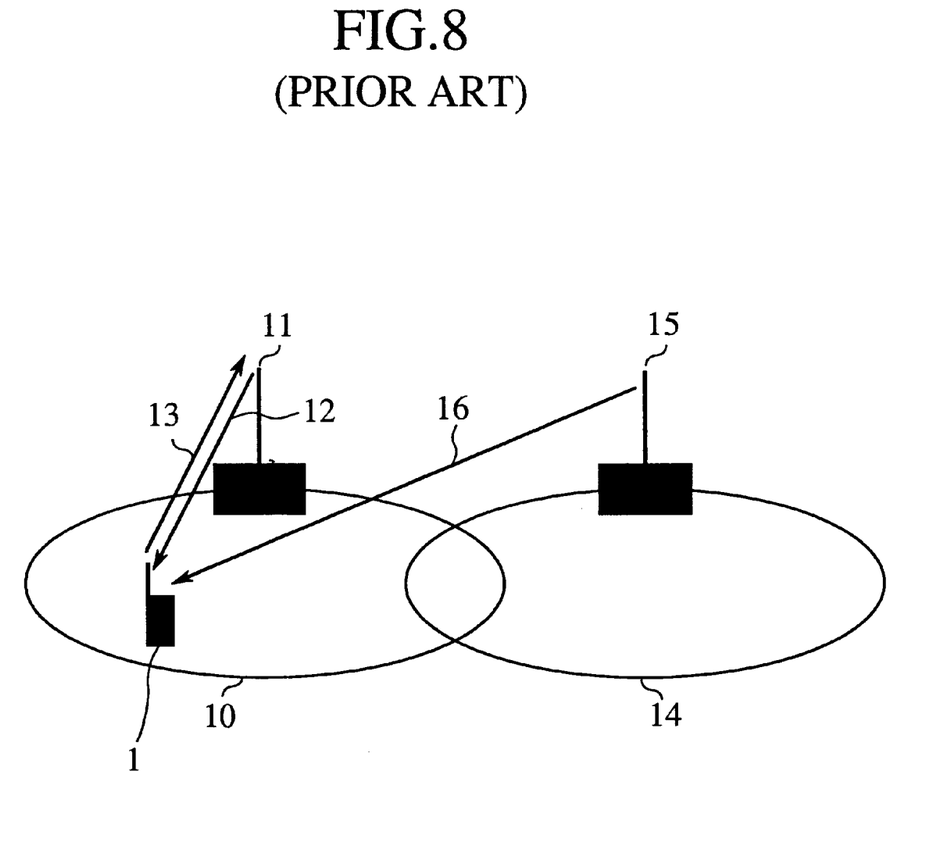
FIG. 8 shows a mobile radio communication system according to the related art.

FIG. 8 shows a mobile radio communication system according to the related art. Referring to FIG. 8, numeral 10 indicates an accommodating cell in which a mobile station 1 is located, 11 indicates a base station managing the accommodating cell 10, 12 indicates a broadcast channel such as BCCH transmitted from the base station 11, 13 indicates a common bidirectional control channel such as SACCH transmitted from the mobile station 1, 14 indicates a cell adjacent to the accommodating cell 10, 15 indicates a base station managing the adjacent cell 14, and 16 indicates a broadcast channel transmitted from the base station 15. The mobile station 1 measures a reception level with respect to the accommodating cell 10 and the adjacent cell 14 by receiving the broadcast channels 12 and 16.

The mobile station 1 measures the reception level with respect to the accommodating cell 10 and the adjacent cell 14 at a predetermined interval and sends the result of measurement with respect to the accommodating cell 10 and the adjacent cell 14 to the base station 11 of the accommodating cell 10 via the SACCH channel using burst transmission. The base station 11 determines whether a handover is necessary in accordance with the result of measurement of reception level with respect to the accommodating cell received from the mobile station 1. The process of reception level measurement and the burst transmission consume a relatively large portion of the power needed for the mobile station.

Figure 9A:
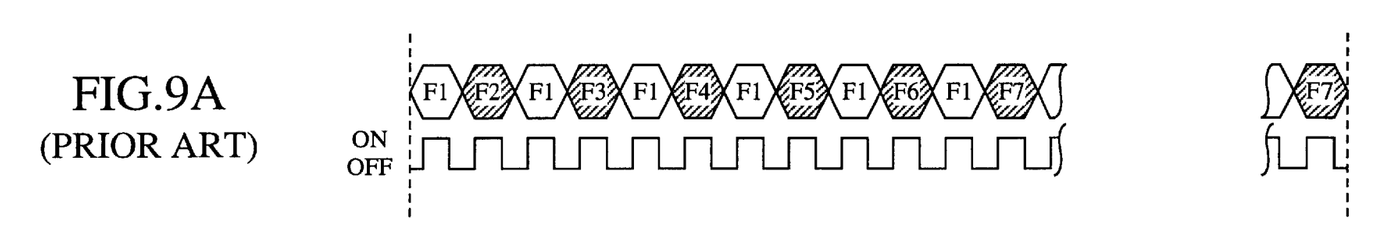
FIG. 9A illustrates a fist reception level measurement according to the related art.
Figure 9B:
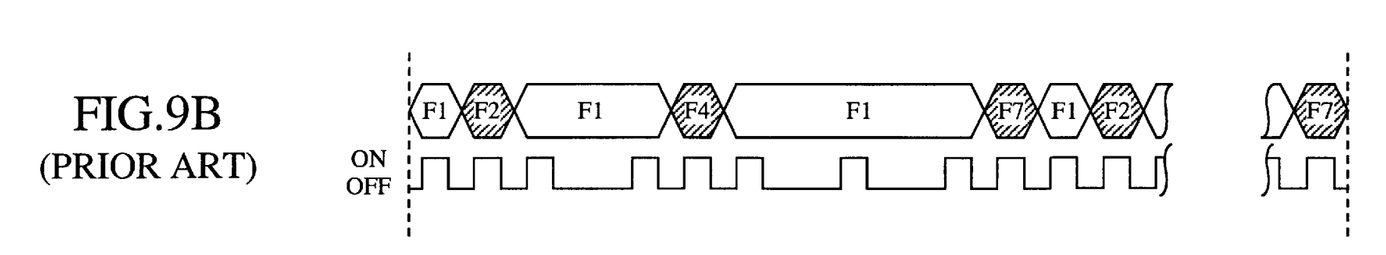
FIG. 9B illustrates a second reception level measurement according to the related art.
Figure 9C:
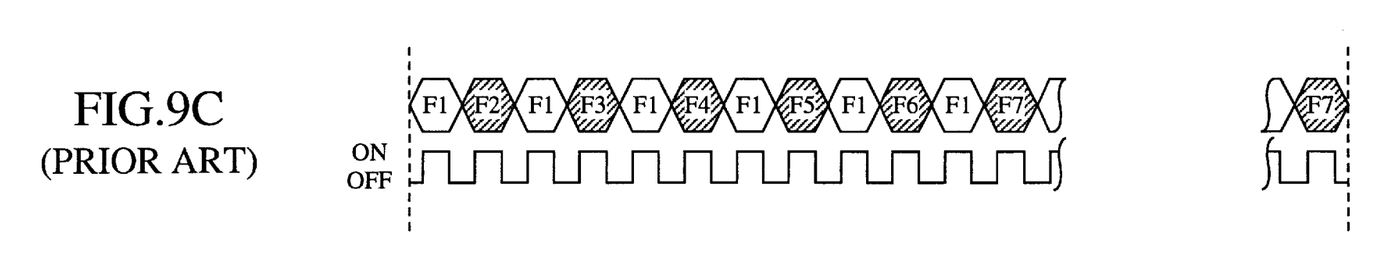
FIG. 9C illustrates a third reception level measurement according to the related art.

One approach to reduce power consumed in the reception level measurement and the burst transmission is disclosed in Japanese Laid-Open Patent Application No. 8-195711. FIG. 9A illustrates a first reception level measurement, FIG. 9B illustrates a second reception level measurement, and FIG. 9C illustrates a third reception level measurement. In a mobile communication system disclosed in Japanese Laid-Open Patent Application No. 8-195711, the mobile station measures the reception level of common line channels (frequencies F1–F7) transmitted from the base station of the accommodating cell and those of the adjacent cells. More specifically, as shown FIG. 9A, the first measurement is performed by alternatively measuring the reception level of the common line channel (frequency F1) of the accommodating cell and the common line channel (one of frequencies F2–F7) of an adjacent cell. The mobile station organizes the adjacent cells into a first group characterized by a relatively high reception level and a second group characterized by a relatively low reception level.

The second measurement is performed as shown in FIG. 9B by measuring the reception level of the signals with the frequencies F2, F4 and F7 corresponding to respective adjacent cells characterized by a relatively high reception level and measuring the signal with the frequency F1 corresponding to the accommodating cell. In the second measurement, the reception level measurement process is suspended during time frames used to measure the signals with the frequencies F3, F5 and F6 in the first measurement. In the third reception level measurement that follows, a reception level measurement process like that of the first reception level measurement is performed. By organizing the adjacent cells into two groups characterized by a relatively high reception level and a relatively low reception level, respectively, in the first measurement process, and by measuring the reception levels only with respect to the adjacent cells characterized by a relatively high reception level, power consumed by the mobile station is reduced.

When the mobile station reaches the neighborhood of a boundary of the accommodating cell, the reception level of the radio wave arriving from the base station of the accommodating cell drops. This causes the quality of communication between the mobile station and the base station to deteriorate. When the base station detects a drop in the reception level with respect to the accommodating cell reported by the mobile station, the base station determines that a handover is necessary. Upon determination that a handover is necessary, the most suitable destination cell is selected based on the results of measurement of reception level of the adjacent cells reported by the mobile station. When the mobile station is located near the center of the accommodating cell, the reception level is stable and the state of communication is satisfactory. Therefore, the mobile station is not required to perform the reception level measurement process and the transmission of the measurement result to the base station.

Similarly, when the mobile station is stationary in the accommodating cell or moving at an extremely slow speed, the mobile station is not required to perform the reception level measurement process and the transmission of the measurement result because the physical position with respect to the accommodating cell remains unchanged and the reception level remains substantially constant. However, the frequency of reception level measurement process should be changed depending on the speed of movement of the mobile station. For example, in order to maintain a high precision in reception level measurement in a severe fading condition occurring when the mobile station is moving at a high speed, for example, the reception level measurement process should be performed at predetermined intervals so that levels measured at a large number of sample points should be averaged so as to determine average point-by-point electric field intensity levels.

In a slight fading condition in which the mobile station is stationary or moving at a slow speed, it is not necessary to provide as many sample points as are provided in a severe fading condition since high-precision reception level measurement is possible using a smaller number of sample points in a slight fading condition. Therefore, when the mobile station is stationary or moving at a relatively low speed, power consumption can be reduced by decreasing the frequency of reception level measurement process as compared to a high-speed condition.

In the related-art reception level measurement process, the current location or movement of the mobile station in the accommodating cell is not considered, thus preventing precise reception level measurement control from being performed.

SUMMARY OF THE INVENTION

Accordingly, a general object of the present invention is to provide a mobile communication terminal apparatus in which the aforementioned drawback is eliminated.

Another and more specific object of the present invention is to provide a mobile communication terminal apparatus in which power consumption is reduced by controlling the reception level measurement process in accordance with the location and movement of the mobile communication terminal apparatus in a cell accommodating the apparatus.

The aforementioned objects can be achieved by a mobile communication terminal apparatus comprising: a radio component for transferring an information signal with respect to a first base station provided in an accommodating cell and second base stations provided in respective adjacent cells, over a broadcast channel transmitted from each of the first and second base stations and a common bidirectional control channel for transmission to each of the first and second base stations; a reception level measuring unit for measuring a reception level of a radio wave arriving from each of the first and second base stations; and a radio control unit for controlling the radio component by determining a current location of the mobile communication terminal apparatus in the accommodating cell based on the reception level with respect to the accommodating cell measured by the reception level measuring unit, suspending measurement of the reception level with respect to the accommodating cell, and suspending burst transmission for transmitting a result of measurement of the reception level to each of the first and second base stations, when it is determined that the mobile communication apparatus is located near a center of the accommodating cell.

The radio control unit may determine the current location by comparing an average reception level calculated on the basis of a plurality of point-by-point average electric field intensity levels measured by the reception level measuring unit, with a predetermined threshold value.

The aforementioned objects can also be achieved by a mobile communication terminal apparatus comprising: a radio component for transferring an information signal with respect to a first base station provided in an accommodating cell and second base stations provided in respective adjacent cells, over a broadcast channel transmitted from each of the first and second base stations and a common bidirectional control channel for transmission to each of the first and second base stations; a reception level measuring unit for measuring a reception level of a radio wave arriving from each of the first and second base stations; and a radio control unit for controlling the radio component by determining a movement of the mobile communication terminal apparatus in the accommodating cell based on the reception level with respect to the accommodating cell measured by the reception level measuring unit, and reducing a frequency of measurement of the reception level with respect to the accommodating cell, when it is determined that the mobile communication apparatus is substantially stationary.

The radio control unit may determine the movement by comparing a reception level fluctuation derived by calculating a distribution of point-by-point average electric field intensity levels measured by the reception level measuring unit, with a predetermined threshold value.

The aforementioned objects can also be achieved by a mobile communication terminal apparatus comprising: a radio component for transferring an information signal with respect to a first base station provided in an accommodating cell and second base stations provided in respective adjacent cells, over a broadcast channel transmitted from each of the first and second base stations and a common bidirectional control channel for transmission to each of the first and second base stations; a reception level measuring unit for measuring a reception level of a radio wave arriving from each of the first and second base stations; and a radio control unit for controlling the radio component by determining a current location and movement of the mobile terminal apparatus in the accommodating cell based on the reception level with respect to the accommodating cell measured by the reception level measuring unit, suspending measurement of the reception level with respect to the accommodating cell, reducing a frequency of measurement of the reception level with respect to the accommodating cell, and suspending burst transmission for transmitting a result of measurement of the reception level to each of the first and second base stations, when it is determined that the mobile communication apparatus is substantially stationary near a center of the accommodating cell.

The radio control unit may determine the current location by comparing an average reception level derived from point-by-point average electric field intensity levels measured by the reception level measuring unit, with a first predetermined threshold value, and determines the movement by comparing a reception level fluctuation derived by calculating a distribution of point-by-point average electric field intensity levels, with a second predetermined threshold value.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

Embodiment 1

The mobile communication terminal apparatus according to the present invention determines its current location in an accommodating cell based on the reception level with respect to the accommodating cell and suspends the reception level measurement process with respect to adjacent cells depending on the current location. By suspending the unnecessary reception level measurement process, power consumption required for the reception level measurement process and burst transmission for reporting the result of reception level measurement to a base station is reduced. The mobile communication terminal apparatus according to a first embodiment performs: a reception level measurement process for measuring the reception level with respect to the accommodating cell; a current location determination process for determining the current location within the accommodating cell based on the reception level; and a reception level measurement control process for either suspending or reducing the frequency of the reception level measurement process with respect to the accommodating cell or the adjacent cells depending on the current location. A description will now be given in the following of the construction of the mobile communication terminal apparatus according to the first embodiment of the present invention as well as the reception level measurement process, the current location determination process and the reception level measurement control process according to the first embodiment.

Figure 1:
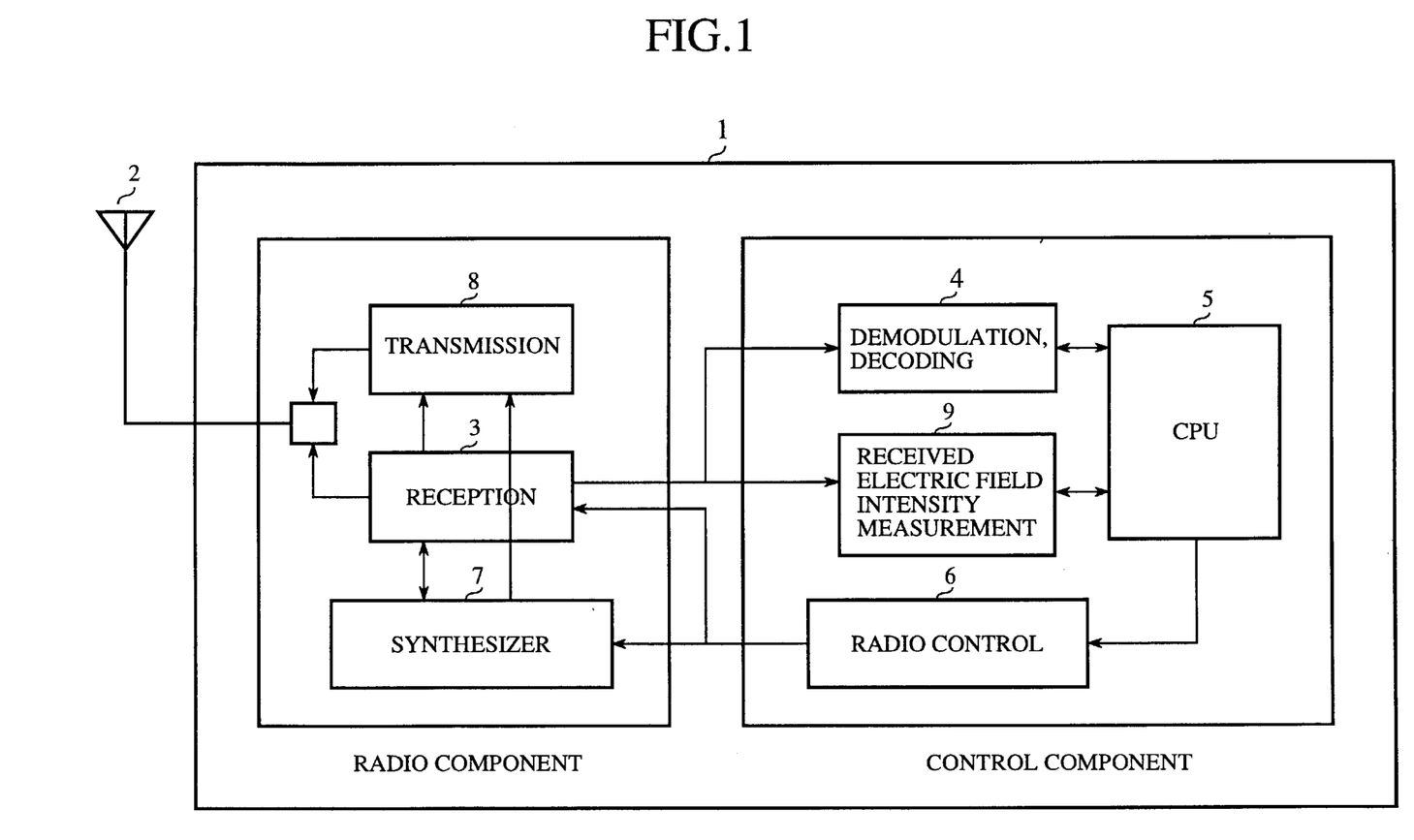
FIG. 1 is a block diagram showing the construction of a mobile communication terminal apparatus according to the invention.

FIG. 1 is a block diagram showing the construction of the mobile communication terminal apparatus according to the first embodiment of the present invention. Referring to FIG. 1, reference numeral 1 indicates a mobile communication terminal apparatus (hereinafter, referred to as a mobile station), 2 indicates a transmission and reception antenna, 3 indicates a reception unit, 4 indicates a demodulating and decoding unit, 5 indicates a CPU, 6 indicates a radio control unit, 7 indicates a synthesizer, 8 indicates a transmission unit, and 9 indicates a received electric field intensity measuring unit. From a larger perspective, the mobile communication terminal apparatus comprises a radio component and a control component. The radio component includes the reception unit 3, the synthesizer 7 and the transmission unit 8. The control component includes the demodulating and decoding unit 4, the CPU 5, the radio control unit 6 and the received electric field intensity measuring unit 9. The radio control unit 6 provided in the control component accesses a communication channel and transfers an information signal by controlling the radio component.

Figure 2:
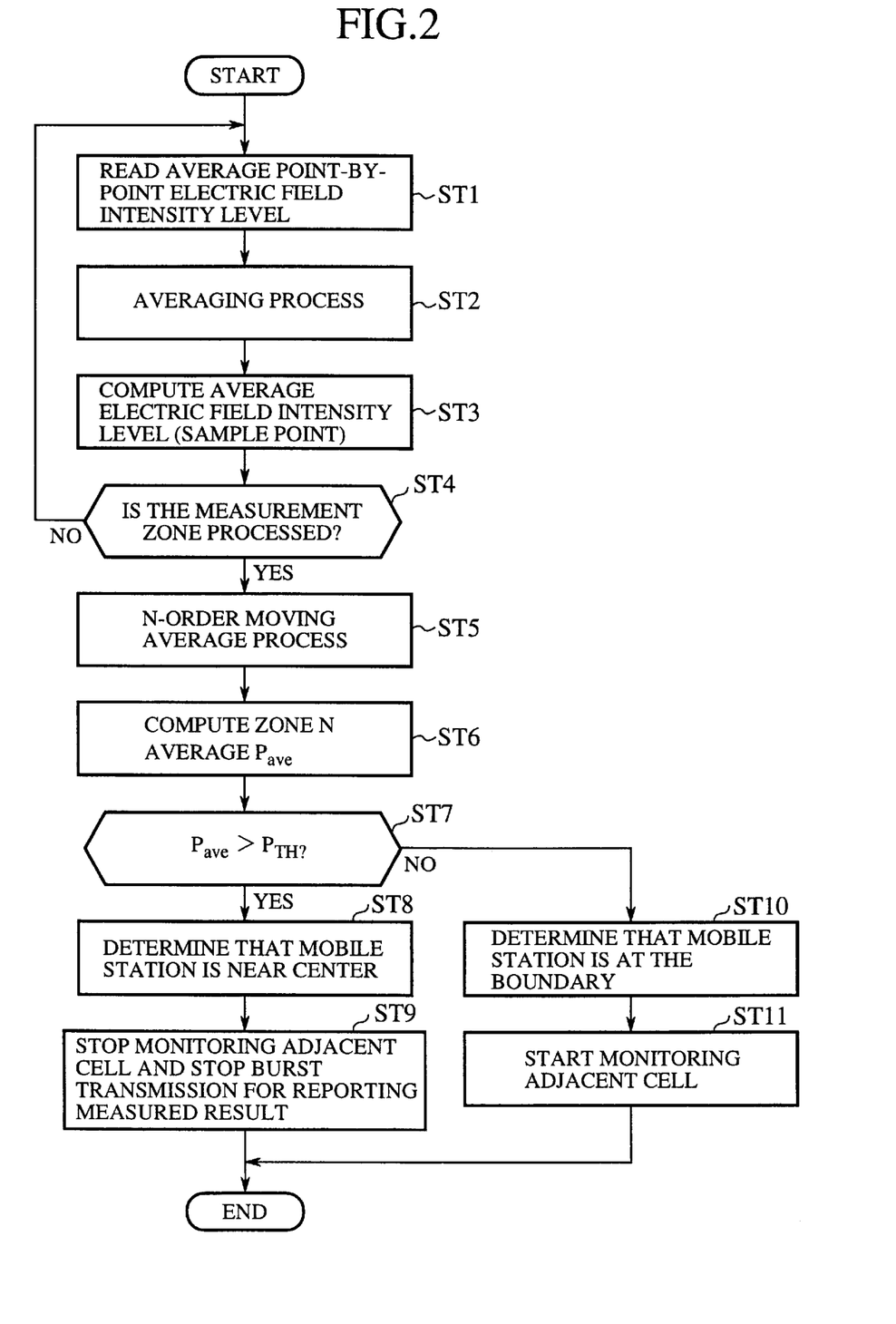
FIG. 2 is a flowchart showing an algorithm of a process for controlling reception level measurement.

FIG. 2 is a flowchart showing an algorithm for CPU processes including the reception level measurement process, the current location determination process and the reception level measurement control process. Referring to FIG. 2, steps ST1 through ST4 correspond to the reception level measurement process, steps ST5 through ST8 and step ST10 correspond to the current location determination process, and steps ST9 and ST11 correspond to the reception level measurement control process.

Figure 3A:
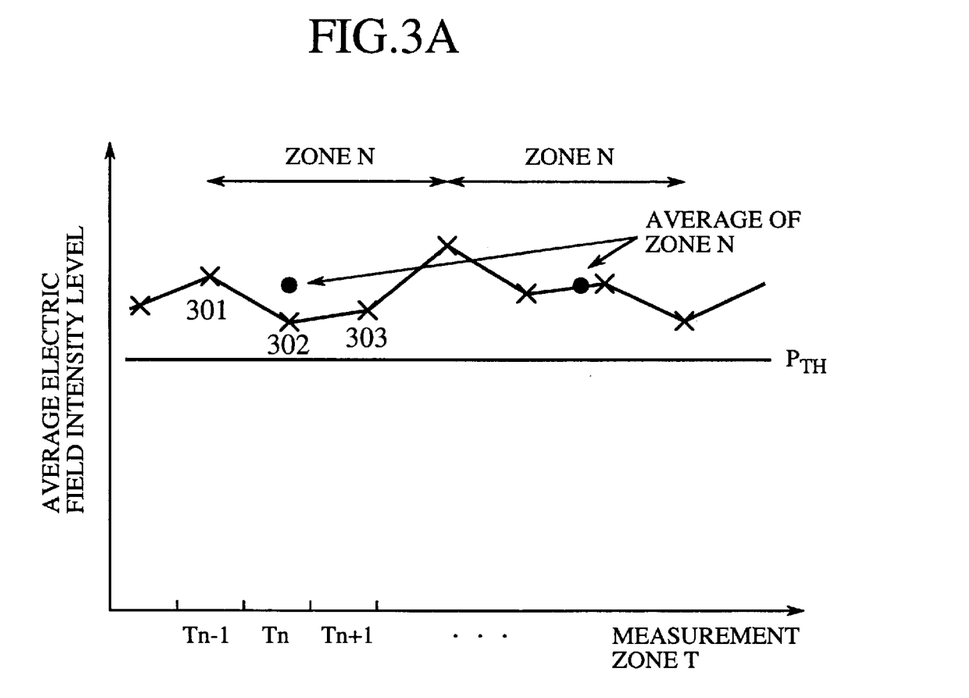
FIG. 3A is a graph showing a relationship between reception level measurements and a predetermined threshold level occurring when a mobile station is located near the center of an accommodating cell.
Figure 3B:
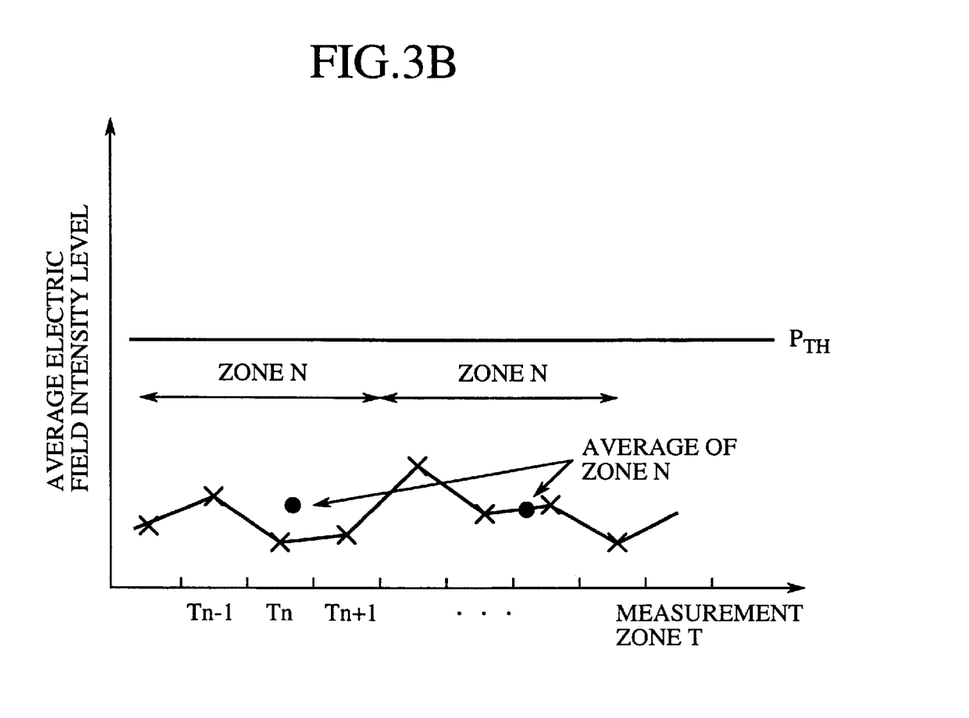
FIG. 3B is a graph showing a relationship between reception level measurements and a predetermined level occurring when a mobile station is located in the neighborhood of the boundary of an accommodating cell.

FIG. 3A is a graph showing a relationship between reception level measurements and a predetermined threshold level occurring when the mobile station is located approximately at the center of an accommodating cell. FIG. 3B is a graph showing a relationship between reception level measurements and a predetermined level occurring when the mobile station is located in the neighborhood of the boundary of the accommodating cell. The measurement zone T shown in FIG. 3 is divided into zones each denoted by N. Each of zones N is further divided into measurement zones $T_{n-1}$, $T_n$, and $T_{n+1}$. The mobile station first measures the reception level in the measurement zones $T_{n-1}$, $T_n$, and $T_{n+1}$ so as to determine an average point-by-point electric field intensity level.

Figure 4A:
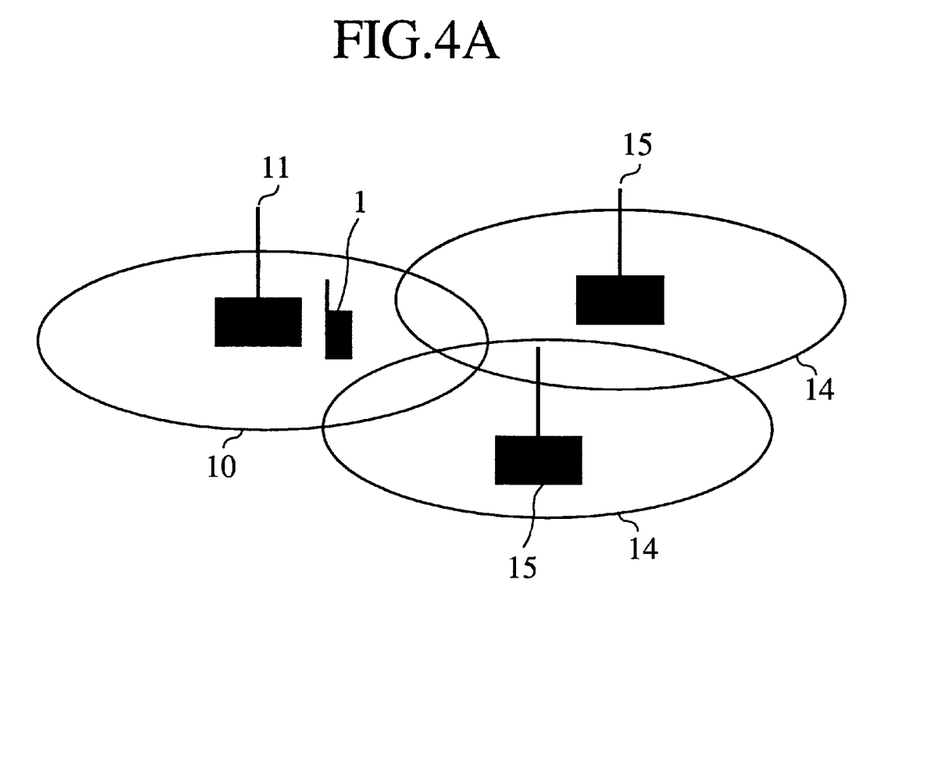
FIG. 4A illustrates the location of a mobile station near the center of an accommodating cell.
Figure 4B:
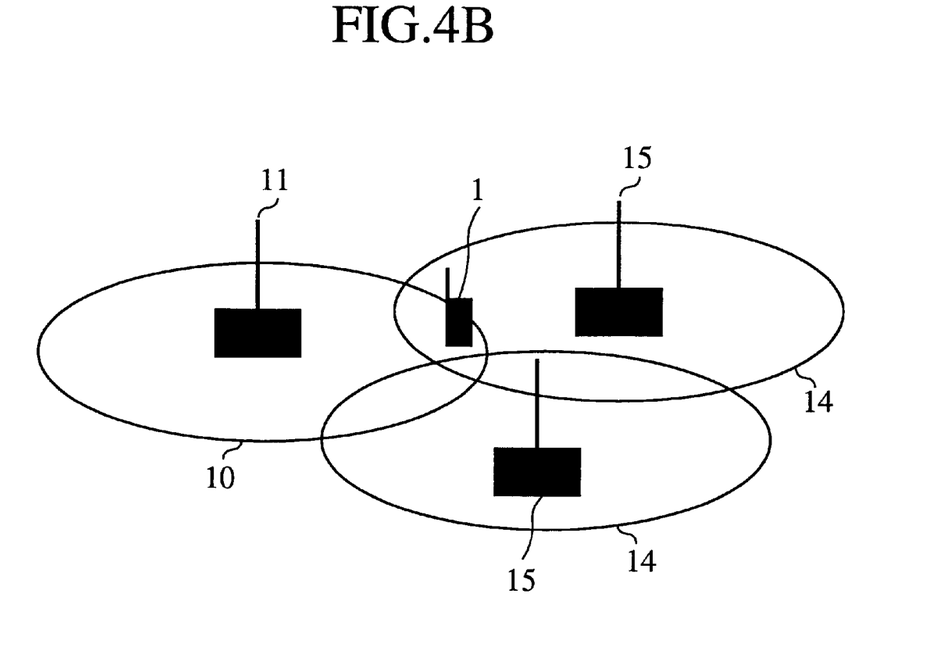
FIG. 4B illustrates the location of a mobile station in the neighborhood of the boundary of an accommodating cell.

FIGS. 4A and 4B illustrate the location of the mobile station in relation to the accommodating cell. More particularly, FIG. 4A illustrates the location of the mobile station near the center of accommodating cell. FIG. 4B illustrates the location of the mobile station in the neighborhood of the boundary between the accommodating cell and the adjacent cell.

Figure 5A:
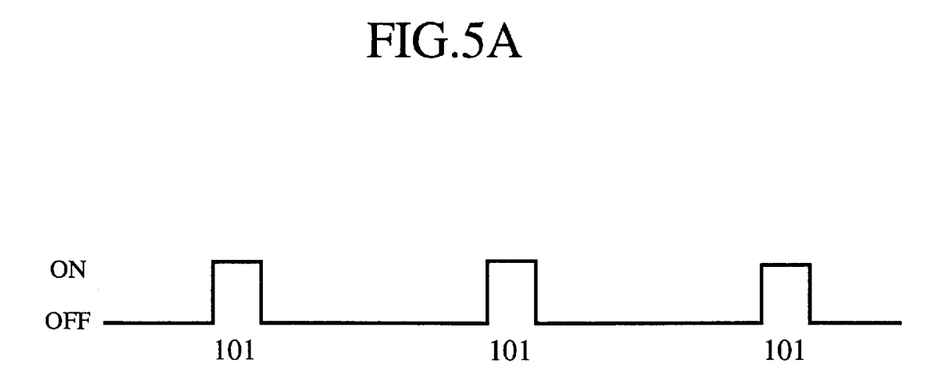
FIG. 5A illustrates the operation of a mobile station located near the center of an accommodating cell.
Figure 5B:
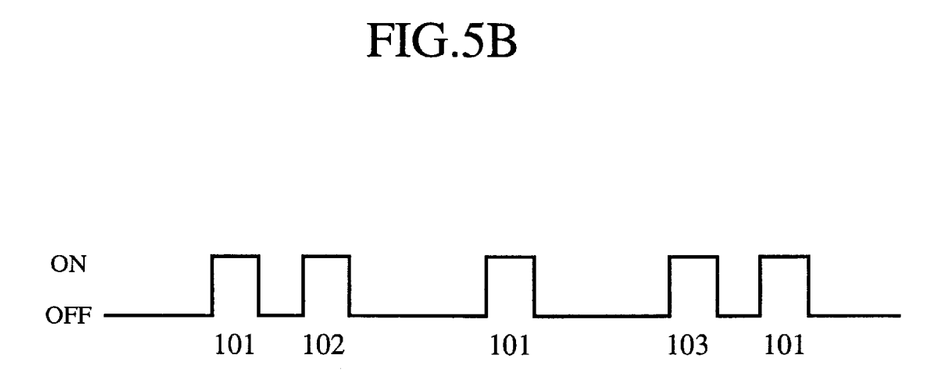
FIG. 5B illustrates the operation of a mobile station located in the neighborhood of an accommodating cell.

FIG. 5A illustrates the operation of the mobile station located near the center of the accommodating cell as shown in FIG. 4A. FIG. 5B illustrates the operation of the mobile station located in the neighborhood of the boundary of the accommodating cell, as shown in FIG. 4B.

The construction and operation of the mobile station 1 will now be described with reference to FIGS. 1 and 8. The signal contained in the broadcast channel 12 transmitted from the base station 1 is inputted into the demodulating and decoding unit 4 via the antenna 2 and the reception unit 3. The demodulating and decoding unit 4 demodulates the received signal and outputs the demodulated data to the CPU 5. The CPU 5 computes the frequency and timing of the accommodating cell 10 and the adjacent cell 14 based on the data demodulated by the demodulating and decoding unit 4. The CPU 5 then outputs the frequency and timing thus computed to the radio control unit 6.

The radio control unit 6 controls the synthesizer 7 based on the frequency and timing transmitted from the CPU 5. The transmission unit 8 accesses the broadcast channel 12 by performing burst transmission in accordance with the control effected by the synthesizer 7. The transmission unit 8 is provided with a power amplifier for raising the power of a transmission signal to a transmission level by amplification and is the mobile communication terminal apparatus component consuming the largest power. The shorter the operating time of the transmission unit 8, the smaller the power consumption.

The received electric field intensity measuring unit 9 measures an average point-by-point electric field intensity level using the broadcast channel 12 with respect to the accommodating cell 10 and the adjacent cell 14. The average point-by-point electric field intensity level measured by the received electric field intensity measuring unit 9 is output to the CPU 5.

The CPU 5 averages a plurality of average point-by-point electric field intensity levels measured by the received electric field intensity measuring unit 9 so as to determine an average electric field intensity level. By applying the average electric field intensity level to a moving average filter provided in the CPU 5, the reception levels with respect to the accommodating cell 10 and the adjacent cell 14 are determined. The radio control unit 6 controls the synthesizer 7 based on the frequency and timing of the SACCH channel 13. The transmission unit 8 performs burst transmission in accordance with the control effected by the synthesizer 7 and reports the reception level measurement to the base station via the SACCH channel 13.

The reception level measurement process, the current location determination process and the reception level measurement control process will now be described with reference to FIGS. 2–4B. Referring to FIG. 2, the CPU 5 reads the average point-by-point electric field intensity levels in the measurement zone $T_{n-1}$ measured by the received electric field intensity measuring unit 9 (step ST1). FIGS. 3A and 3B do not show any of a plurality of average point-by-point electric field intensity level measurements. The average point-by-point electric field intensity levels are subject to an averaging process such as an arithmetic mean process, a root mean square process and a weighted mean process (step ST2) so as to obtain an average electric field intensity level in the measurement zone $T_{n-1}$ (step ST3). By subjecting the average point-by-point electric field intensity levels in a given zone to an averaging process of step ST2, a sample point 301 shown in FIG. 3A in the measurement zone $T_{n-1}$ is obtained.

The sample point 301 indicates the average electric field intensity level in the measurement zone $T_{n-1}$. A determination is then made as to whether the average electric field intensity levels are computed for all the measurement zones included in zone N (step ST4). If the average electric field intensity level has not been computed for all of the measurement zones included in zone N, steps ST1 through ST4 are repeated. Assuming that the average electric field intensity level has not been computed for the measurement zones $T_n$ and $T_{n+1}$, steps ST1 through ST4 are repeated for the measurement zones $T_n$ and $T_{n+1}$ so as to obtain sample points 302 and 303.

When the average electric field intensity levels for all the measurement zones included in zone N have been computed, the CPU 5 subjects the average electric field intensity levels in the measurement zones $T_{n-1}$, $T_n$, and $T_{n+1}$ to the N-order moving average filter process (step ST5). By subjecting the average electric field intensity levels in the measurement zones to the N-order moving average filter process, the average level $P_{ave}$ of zone N shown in FIG. 3 is computed (step ST6). The N-order moving average filter is provided in the CPU 5. This is how the mobile station measures the average level of each of zones N included in the measurement zone T.

When the average level in each of zones N included in the measurement zone T has been determined, the CPU determines the current location by comparing the average level $P_{ave}$ of zone N with a predetermined threshold level $P_{TH}$ (step ST7). When the average level $P_{ave}$ of zone N is determined to be higher than the predetermined threshold level $P_{TH}$, as shown in FIG. 3A, a determination is made that the mobile station is located near the center of the accommodating cell, as shown in FIG. 4A (step ST8). Thereupon, the reception level measurement is controlled such that the reception level measurement process with respect to the adjacent cells is suspended (step ST9).

When the average level $P_{ave}$ of zone N is determined to be lower than the predetermined threshold level $P_{TH}$, as shown in FIG. 3B, a determination is made that the mobile station is located in the neighborhood of the boundary of the accommodating cell, as shown in FIG. 4B (step ST10). The reception level measurement is controlled such that the reception level measurement with respect to the adjacent cells is started (step ST11). The threshold level $P_{TH}$ used in step ST7 for determining the current location may be determined in a systematic manner or determined on the basis of a cut and try method by performing field tests.

The mobile station 1 determined to be currently located near the center of the accommodating cell controls the reception level measurement procedure as shown in FIG. 5A. Pulses 101–103 in the graphs of FIGS. 5A and 5B indicate time slots allocated to predetermined processes performed by the mobile station. More specifically, 101 indicates a time slot allocated to reception of the broadcast channel signal transmitted from the base station of the accommodating cell and measurement of the reception level with respect to the accommodating cell. 102 indicates a time slot allocated to measurement of the reception level with respect to an adjacent cell. 103 indicates a time slot allocated to burst transmission for reporting the result of reception level measurement to the base station. The power of the mobile station is turned on during the time slots 101–103 and turned off during the intervals between time slots.

When the mobile station 1 is located near the center of the accommodating cell 10, the mobile station operates as indicated by FIG. 5A. That is, the mobile station 1 measures the reception level with respect to the accommodating cell during the time slot 101. The mobile station 1 controls the reception level measurement such that the process performed in the time slot 102 is suspended and the burst transmission performed in the time slot 103 is also suspended.

When it is determined as a result of the current location determination process that the mobile station 1 is located in the neighborhood of the boundary of the accommodating cell 10 as shown in FIG. 4B, the mobile station 1 measures the reception level with respect to the adjacent cells in the time slot 102, in addition to measuring the reception level with respect to the accommodating cell in the time slot 101. In the time slot 103, the mobile station 1 performs burst transmission so as to report the result of measurement to the base station 11.

Thus, in the mobile station 1 determined to be located near the center of the accommodating cell as a result of the current location determination process, it is at least possible to reduce the power consumed in the measurement of reception level with respect to the adjacent cells and in the burst transmission.

Suspension of burst transmission is particularly helpful in reducing power consumption since it reduces the operating time of the transmission unit 8, which includes a power amplifier characterized by relatively large power consumption among the components constituting the mobile station 1.

As has been described, the mobile station according to the first embodiment determines the current location in the accommodating cell based on the reception level with respect to the accommodating cell. The mobile station either starts or suspends the reception level measurement process depending on the current location thus determined. By determining the current location by measuring the reception level in the accommodating cell and in the adjacent cells, a determination is made as to whether communication can be properly maintained. If the current reception level demonstrates that the mobile station is located near the center of the accommodating cell where the proper communication is ensured, the reception level measurement process with respect to the adjacent cells and the burst transmission for reporting the result of measurement are suspended. As a result, power consumption is reduced.

Embodiment 2

Thus, the mobile station 1 according to the first embodiment of the present invention reduces power consumption by determining the current location based on the level of reception with respect to the accommodating cell and suspending the reception level measurement with respect to the adjacent cells and burst transmission of the result of measurement, when it is determined that the mobile station is located near the center of the accommodating cell. In contrast, the mobile station according to the second embodiment reduces power consumption by determining its movement based on the reception level with respect to the accommodating cell and controlling the measurement of reception level with respect to the adjacent cells in accordance with the movement.

The mobile station according to the second embodiment achieves the aforementioned objective by performing a reception level measurement process for measuring the reception level with respect to the accommodating cell, a movement determination process for determining the movement of the mobile station based on the reception level, and a reception level measurement control process for suspending or reducing the frequency of the reception level measurement with respect to the accommodating cell or the adjacent cells, depending on the movement.

A description will now be given of the reception level measurement process, the movement determination process and the reception level measurement control process performed by the mobile station according to the second embodiment. It is assumed that the construction of the mobile station according to the second embodiment is the same as that of FIG. 1 and the mobile radio communication system according to the second embodiment is the same as that of FIG. 8 so that the description of the construction and the system is omitted.

Figure 6A:
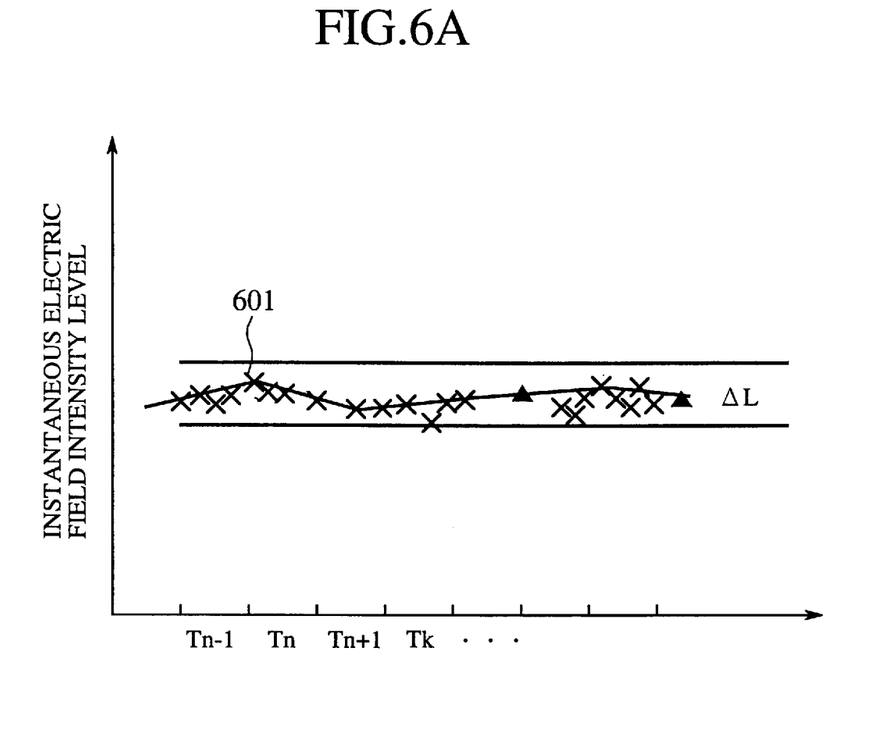
FIG. 6A is a graph showing the result of measurement of the reception level when a mobile station is stationary or slowly moving.
Figure 6B:
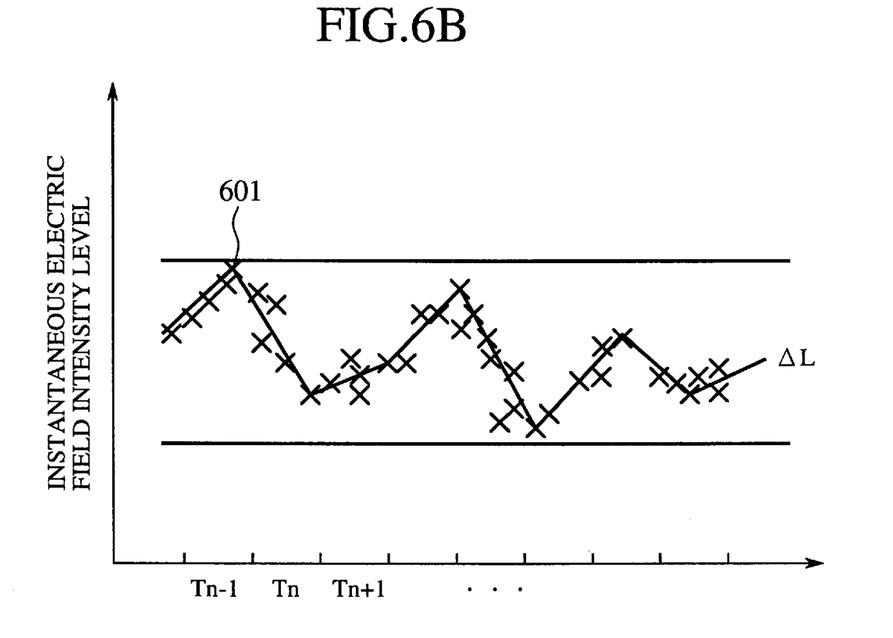
FIG. 6B is a graph showing the result of measurement of the reception level when a mobile station is moving.

FIGS. 6A and 6B are graphs showing the result of measurement of reception level (instantaneous electric field intensity level) at respective states of movement. FIG. 6A shows the result of measurement when the mobile station is stationary or slowly moving. FIG. 6B shows the result of measurement when the mobile station is moving.

A description will now be given of the reception level measurement process preformed by the mobile station according to the second embodiment. Referring to FIGS. 6A and 6B, the CPU 5 shown in FIG. 1 reads point-by-point average electric field intensity level measurements 601 in the measurement zones $T_{n-1}$, $T_n$, and $T_{n+1}$ determined by the received electric field intensity measuring unit 9. The CPU 5 then computes a fluctuation $\Delta L$ in the reception level by determining a distribution a of the plurality of point-by-point average electric field intensity level measurements 601. As described in the first embodiment, by averaging the point-by-point average electric field intensity levels in the respective measurement zones, a plurality of average electric field intensity levels (see FIGS. 3A and 3B) in the respective measurement zones $T_{n-1}$, $T_n$, and $T_{n+1}$ can be given.

Figure 7A:
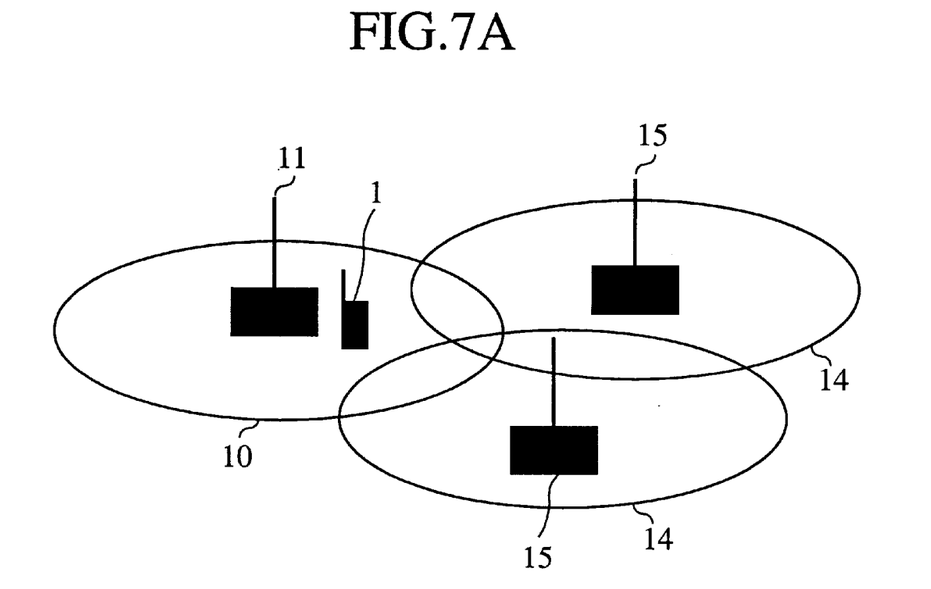
FIG. 7A illustrates a mobile station in a substantially stationary state in an accommodating cell.

After performing the reception level measurement process and calculating the fluctuation $\Delta L$ in the reception level, the mobile station determines the movement by comparing the fluctuation $\Delta L$ with a predetermined threshold value $\sigma_{TH}$. The predetermined threshold value $\sigma_{TH}$ is not shown in FIGS. 6A and 6B and signifies a permitted range of variation in the fluctuation $\Delta L$. If the fluctuation $\Delta L$ in the reception level is smaller than the threshold value $\sigma_{TH}$, as shown in FIG. 6A ($\Delta L < \sigma_{TH}$). it is determined that the mobile station is stationary or moving at an extremely low speed, as shown in FIG. 7A. Thereupon, the reception level measurement process is controlled such that the frequency of reception level measurement with respect to the accommodating cell in the measurement zone $T_k$ shown in FIG. 6A is reduced and the burst transmission of the result of reception is suspended.

Figure 7B:
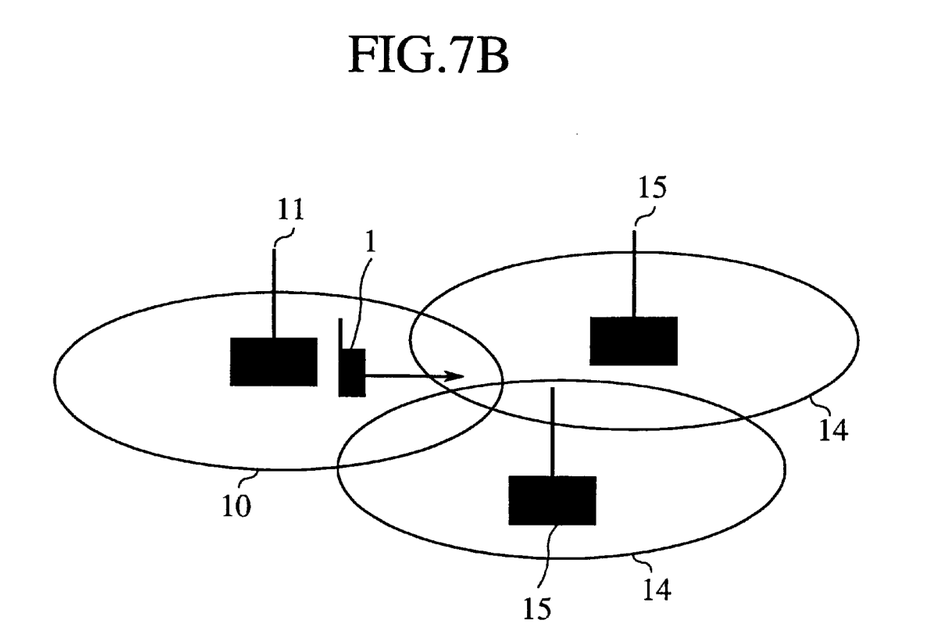
FIG. 7B illustrates a mobile station moving in an accommodating cell.

The graph of FIG. 6B shows that the fluctuation $\Delta L$ is relatively large as compared to the corresponding fluctuation $\Delta L$ of FIG. 6A. This means that a variation in point-by-point average electric field intensity levels is relatively large. Therefore, in order to maintain a predetermined level of precision in the reception level measurement, measurement of point-by-point average electric field intensity levels must be undertaken on a comparatively regular basis, thus making it impossible to reduce the frequency of reception level measurement. Thus, if the fluctuation $\Delta L$ in the reception level is determined to be larger than the threshold value $\sigma_{TH}$ ($\Delta L > \sigma_{Th}$), as shown in FIG. 6B, as a result of the determination on the movement, it is determined that the mobile station is moving as shown in FIG. 7B. The reception level measurement process for measuring point-by-point average electric field intensity levels is continued.

Provision of the mobile station according to the second embodiment derives from a notion that high-precision reception level measurement is relatively easy using a smaller number of sample points (i.e., smaller number of point-by-point average electric field intensity level measurements) in a slight fading environment, occurring when a mobile is stationary or moving at a small speed, as compared to a severe fading environment occurring when the mobile is moving at a relatively high speed. To achieve the goal, the mobile station according to the second embodiment performs a reception level measurement process for measuring variation in the reception level, a movement determination process for determining the movement of the mobile station, and a reception level measurement control process for suspending or reducing the frequency of the reception level measurement with respect to the accommodating cell when the mobile station is substantially stationary.

Upon determining that the mobile station 1 is substantially stationary as a result of the movement determination process, the mobile station 1 can reduce the power consumed in the reception level measurement with respect to the accommodating cell and the power consumed in the burst transmission. Suspension of burst transmission is particularly helpful in reducing power consumption since it reduces the operating time of the transmission unit 8, which includes a power amplifier characterized by relatively large power consumption among the components constituting the mobile station 1.

The current location determination process described in the first embodiment and the movement determination process described in the second embodiment may be employed in combination for more precise reception level measurement control. For example, when it is determined as a result of the current location determination process and the movement determination process that the mobile station is relatively stationary near the center of the accommodating cell, the reception level measurement process with respect to the adjacent cells may be suspended and, moreover, the frequency of the reception level measurement process with respect to the accommodating cell may be reduced, since the level of radio reception from the base stations is stable and the reception level measurement is not expected to fluctuate to a significant degree.

The present invention is not limited to the above-described embodiments, and variations and modifications may be made without departing from the scope of the present invention.

What is claimed is:

1. A mobile communication terminal apparatus comprising:
   a radio component for receiving over a broadcast channel an information signal transmitted by a first base station provided in an accommodating cell and for receiving information signals transmitted by secondary base stations provided in respective adjacent cells;

a reception level measuring unit for measuring a reception level of each of the information signals received by said radio component from each of the first and secondary base stations; and a radio control unit for controlling said radio component by determining a current location of the mobile communication terminal apparatus relative to the accommodating cell based on the measured reception level, and suspending measurement of the reception level with respect to the accommodating cell, and suspending burst transmission for transmitting a result of measurement of the reception level to each of the first and secondary base stations, when it is determined that the mobile communication terminal apparatus is located near a center of the accommodating cell.

2. The mobile communication terminal apparatus according to claim 1, wherein said radio control unit determines the current location of the apparatus by comparing an average reception level calculated on the basis of a plurality of point-by-point average electric field intensity levels measured by said reception level measuring unit, with a predetermined threshold value.

3. A mobile communication terminal apparatus comprising:

a radio component for receiving over a broadcast channel an information signal transmitted by a first base station provided in an accommodating cell and for receiving information signals transmitted by secondary base stations provided in respective adjacent cells;

a reception level measuring unit for measuring, at a certain measurement frequency, a reception level of each of the information signals received by said radio component from each of the first and secondary base stations; and a radio control unit for controlling said radio component by determining a movement of the mobile communication terminal apparatus in the accommodating cell based on a plurality of reception levels with respect to the accommodating cell measured by said reception level measuring unit, and reducing the frequency of measurement of the reception level with respect to the accommodating cell, when it is determined that the mobile communication apparatus is substantially stationary.

4. The mobile communication terminal apparatus according to claim 3, wherein said radio control unit determines the movement by comparing a reception level fluctuation value derived by calculating a distribution of point-by-point average electric field intensity levels measured by said reception level measuring unit, with a predetermined threshold value.

5. A mobile communication terminal apparatus comprising:

a radio component for receiving over a broadcast channel an information signal transmitted by a first base station provided in an accommodating cell and for receiving information signals transmitted by secondary base stations provided in respective adjacent cells;

a reception level measuring unit for measuring, at a certain measurement frequency, a reception level of each of the information signals received by said radio component from each of the first and secondary base stations; and a radio control unit for controlling said radio component by determining a current location and movement of the mobile terminal apparatus in the accommodating cell based on the reception level with respect to the accommodating cell measured by said reception level measuring unit, and suspending measurement of the reception level with respect to the accommodating cell, reducing a frequency of measurement of the reception level with respect to the accommodating cell, and suspending burst transmission for transmitting a result of measurement of the reception level to each of the first and secondary base stations, when it is determined that the mobile communication apparatus is substantially stationary near a center of the accommodating cell.

6. The mobile communication terminal apparatus according to claim 5, wherein said radio control unit determines the current location by comparing an average reception level derived from point-by-point average electric field intensity levels measured by said reception level measuring unit, with a first predetermined threshold value, and determines the movement by comparing a reception level fluctuation derived by calculating a distribution of point-by-point average electric field intensity levels, with a second predetermined threshold value.

\* \* \* \* \*